(12) United States Patent
Sawada

(10) Patent No.: US 6,373,987 B1
(45) Date of Patent: Apr. 16, 2002

(54) PICTURE-SYNTHETIC SYSTEM AND PICTURE-SYNTHETIC METHOD THEREFOR

(75) Inventor: Hideki Sawada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/304,833

(22) Filed: May 5, 1999

(30) Foreign Application Priority Data

May 22, 1998 (JP) ............................... 10-14190

(51) Int. Cl.[7] .............................. G06K 9/36; G06K 9/46
(52) U.S. Cl. ........................ 382/233; 382/236; 382/284; 382/245; 275/240.25; 348/589
(58) Field of Search .................................. 382/166, 233, 382/236, 245, 274, 284, 294, 239, 232; 348/584, 589, 578; 375/240.23, 240.25, 240.11, 240.26

(56) References Cited

U.S. PATENT DOCUMENTS

| | | | | |
|---|---|---|---|---|
| 5,010,406 A | * | 4/1991 | Kawakami et al. | 358/147 |
| 5,206,714 A | * | 4/1993 | Kim | 358/181 |
| 5,815,206 A | * | 9/1998 | Malladi et al. | 348/390 |
| 6,072,536 A | * | 6/2000 | Beacken et al. | 348/584 |
| 6,141,446 A | * | 10/2000 | Boliek et al. | 382/233 |
| 6,212,236 B1 | * | 4/2001 | Nishida et al. | 375/240.12 |

* cited by examiner

*Primary Examiner*—Bhavesh Mehta
(74) *Attorney, Agent, or Firm*—Foley & Lardner

(57) ABSTRACT

A memory device memorizes the multiplex data of compressed picture data and compressed subordinate picture data. A data-separating section separates the subordinate picture data and a subordinate-picture-decoding section decodes the separated subordinate picture data into the run-length-decoded data. A subordinate-picture-data-converting section changes the format of the decoded subordinate picture data to reduce the number of table-looking-up operations required for a synthesizing process and removes the redundant pixel data which is included in the decoded subordinate picture data and whose contrast values are zero and hence which can not be seen even if synthesized. A picture-synthetic section synthesizes the subordinate picture data converted by the subordinate-picture-data-converting section on the main picture at the designated synthesizing positions.

6 Claims, 4 Drawing Sheets

| 0 | 0 | 0 | 0 | 0 | 0 | 0 | 0 | | | | |
|---|---|---|---|---|---|---|---|---|---|---|---|
| 0 | 1 | 1 | 1 | 1 | 1 | 1 | 0 | | | | |
| 0 | 1 | 1 | 2 | 2 | 1 | 1 | 0 | | | | |
| | | | | | | | | | | | |
| 0 | n-1 | n-1 | n-1 | n-1 | n-1 | n-1 | 0 | | | | |
| | | | | | | | | | | | |
| 0 | 0 | 0 | 0 | 0 | 0 | 0 | 0 | | | | |

| pixel data | color index | contrast |
|---|---|---|
| 0 | | |
| 1 | | |
| 2 | | |
| | | |
| n−1 | | | index table

| color index | Y | U | V |
|---|---|---|---|
| index 0 | | | |
| index 1 | | | |
| index 2 | | | |
| | | | |
| index m−1 | | | | color table

| pixel data | color index | contrast |
|---|---|---|
| 0 | 0 | 0 |
| 1 | 2 | 15 | index table

| color index | Y | U | V |
|---|---|---|---|
| index 0 | 80 | 80 | 80 |
| index 1 | | | |
| index 2 | 10 | 80 | 80 |
| | | | |
| index 15 | | | | color table

PICTURE-SYNTHETIC SYSTEM AND PICTURE-SYNTHETIC METHOD THEREFOR

BACKGROUND OF THE INVENTION

1. Field of the Invention

The present invention relates to a picture-synthetic system for decoding, synthesizing, and reproducing picture data compressed by a MPEG (Moving Picture Experts Group) system and subordinate picture data such as movie or karaoke subtitles compressed by a run-length system, and a picture-synthetic method therefor.

2. Description of the Related Art

In a conventional system for decoding, synthesizing, and reproducing picture data compressed by a MPEG system and subordinate picture data such as movie or karaoke subtitles compressed by a run-length system, the processing of decoding and synthesizing the data are performed by the use of software.

However, in the conventional system, there exists a problem that, when the processing of decoding and synthesizing the data are performed by the use of software, a load on a CPU used for the computation by synthesizing the subordinate picture data on the main picture data is increased and hence the CPU becomes deficient in its capacity for outputting the main picture in real time, which increases the number of omitted frames.

SUMMARY OF THE INVENTION

It is the object of the present invention to provide a picture-synthetic system which can reduce a load on a CPU for synthesizing a still picture such as movie or karaoke subtitles on a moving picture and a picture-synthetic method therefor.

A picture-synthetic system according to the present invention comprises a memory device, a data-separating section, a picture-decoding section, a subordinate-picture-decoding section, a subordinate-picture-data-converting section, and a picture-synthetic section, wherein the memory device has means for memorizing multiplex data of picture data compressed and encoded by a MPEG system and subordinate picture data compressed and encoded by a run-length system; the data-separating section has means for separating the picture data compressed and encoded by the MPEG system and the subordinate picture data compressed and encoded by the run-length system from the multiplex data read out of the memory device and for outputting the picture data compressed and encoded by the MPEG system to the picture-decoding section and the subordinate picture data compressed and encoded by the run-length system to the subordinate-picture-decoding section; the picture-decoding section has means for decoding the picture data compressed and encoded by the MPEG system and for outputting the MPEG-decoded data to the picture-synthetic section; the subordinate-picture-decoding section has means for decoding the subordinate picture data compressed and encoded by the run-length system and for outputting the run-length-decoded data to the subordinate-picture-data-converting section; the subordinate-picture-data-converting section has a data-format-converting section for converting a format of the run-length-decoded data, a redundant-pixel-removing section for removing the redundant pixels of the run-length-decoded data, and means for outputting the converted data to the picture-synthetic section; and the picture-synthetic section has means for synthesizing the converted data received from the subordinate-picture-decoding section on the MPEG-decoded data received from the picture-decoding section in the form of YUV to display.

Further, the data-format-converting section may have means for converting the run-length-decoded data into 8-bit data which indicates a color index value and a contrast value per pixel.

Still further, the redundant-pixel-removing section may have means for changing a display position to a main picture and for outputting to the picture-synthetic section only the rectangular region which includes the effective pixels of the run-length-decoded data, in the case where a region of redundant pixels whose contrast values are all "0" exists outside the rectangular region which includes the effective pixels of the run-length-decoded data.

A picture-synthetic method for the picture-synthetic system according to the present invention comprises the steps of; memorizing multiplex data of the picture data compressed and encoded by the MPEG system and the subordinate picture data compressed and encoded by the run-length system in the memory device; separating the picture data compressed and encoded by the MPEG system and the subordinate picture data compressed and encoded by the run-length system from the multiplex data read out of the memory device and outputting the picture data compressed and encoded by the MPEG system to the picture-decoding section and the subordinate picture data compressed and encoded by the run-length system to the subordinate-picture-decoding section in the data-separating section; decoding the picture data compressed and encoded by the MPEG system and outputting the MPEG-decoded data to the picture-synthetic section in the picture-decoding section; decoding the subordinate picture data compressed and encoded by the run-length system and outputting the run-length-decoded data to the subordinate-picture-data-converting section in the subordinate-picture-decoding section; converting a format of the run-length-decoded data by the data-format-converting section and removing the redundant pixels of the run-length-decoded data by the redundant-pixel-removing section, and outputting the converted data to the picture-synthetic section in the subordinate-picture-data-converting section; and synthesizing the converted data received from the subordinate-picture-data-converting section on the MPEG-decoded data received from the picture-decoding section in the form of YUV to display in the picture-synthetic section.

Further, a picture-synthetic method for the picture-synthetic system according to the present invention may comprise the step of converting the run-length-decoded data into 8-bit data which indicates a color index value and a contrast value per pixel in the data-format-converting section.

Still further, a picture-synthetic method for the picture-synthetic system according to the present invention may comprise the step of changing a display position to a main picture and outputting only the rectangular region which includes the effective pixels of the run-length-decoded data to the picture-synthetic section in the redundant-pixel-removing section, in the case where a region of redundant pixels whose contrast values are all "0" exists outside the rectangular region which includes the effective pixels of the run-length-decoded data.

The present invention provides synthesizing means for reducing a processing load when the subordinate picture data is synthesized on the picture data in the picture-synthetic system for decoding, synthesizing, and reproducing the picture data compressed and encoded by the MPEG system and the subordinate picture data, such as movie or karaoke subtitles, compressed and encoded by the run-length system, and the picture-synthetic method therefor.

The memory device memorizes the multiplex data of the compressed picture data and the compressed subordinate picture data. The data-separating section separates the subordinate picture data and the subordinate-picture-decoding section decodes the separated subordinate picture data into the run-length-decoded-data. The subordinate-picture-data-converting section changes the format of the decoded subordinate picture data to reduce the number of table-looking-up operations required for a process of synthesizing and removes the redundant pixel data which is included in the decoded subordinate picture data and whose contrast values are zero and hence which can not be seen even if synthesized. The picture-synthetic section synthesizes the subordinate picture data converted by the subordinate-picture-data-converting section on the main picture at the designated synthesizing positions.

In this way, the load of the picture-synthetic section when the subordinate picture data is synthesized on the main picture can be reduced by converting the subordinate picture data which is decoded by the run-length system in the subordinate-picture-converting section.

DETAILED DESCRIPTION OF THE PREFERRED EMBODIMENTS

Figure 1:
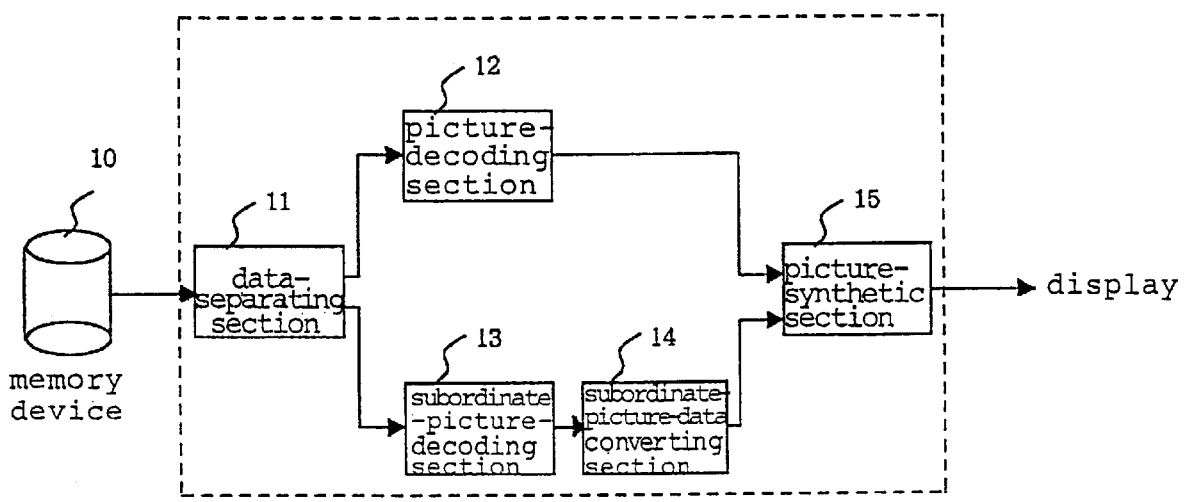
FIG. 1 is a block diagram of a preferred embodiment of the present invention.

FIG. 1 is a block diagram of a preferred embodiment of the present invention. Referring to FIG. 1, the preferred embodiment of the present invention includes a memory device 10, a data-separating section 11, a picture-decoding section 12, a subordinate-picture-decoding section 13, a subordinate-picture-data-converting section 14, and a picture-synthetic section 15.

Memory device 10 memorizes the multiplex data of picture data compressed and encoded by a MPEG system and subordinate picture data, such as movie or karaoke subtitles, compressed and encoded by a run-length system.

Data-separating section 11 separates the compressed image data and the compressed subordinate picture data from the multiplex data read out of memory device 10 and outputs the compressed picture data to picture-decoding section 12 and the compressed subordinate-picture data to subordinate-picture-decoding section 13, respectively.

Picture-decoding section 12 decodes the picture data compressed and encoded by the MPEG system and outputs the decoded data to picture-synthetic section 15.

Subordinate-picture-decoding section 13 decodes the picture data compressed and encoded by the run-length system (hereinafter referred to as "run-length decoding") and outputs the decoded data to subordinate-picture-data-converting section 14.

Subordinate-picture-data-converting section 14 converts a format of the subordinate-picture-data decoded by the run-length system and removes redundant pixels therefrom and outputs the converted data to picture-synthetic section 15.

Picture-synthetic section 15 superimposes the picture data received from subordinate-picture-data-converting section 14 on the picture data received from picture-decoding section 12 in a format of YUV to display.

Figure 2:
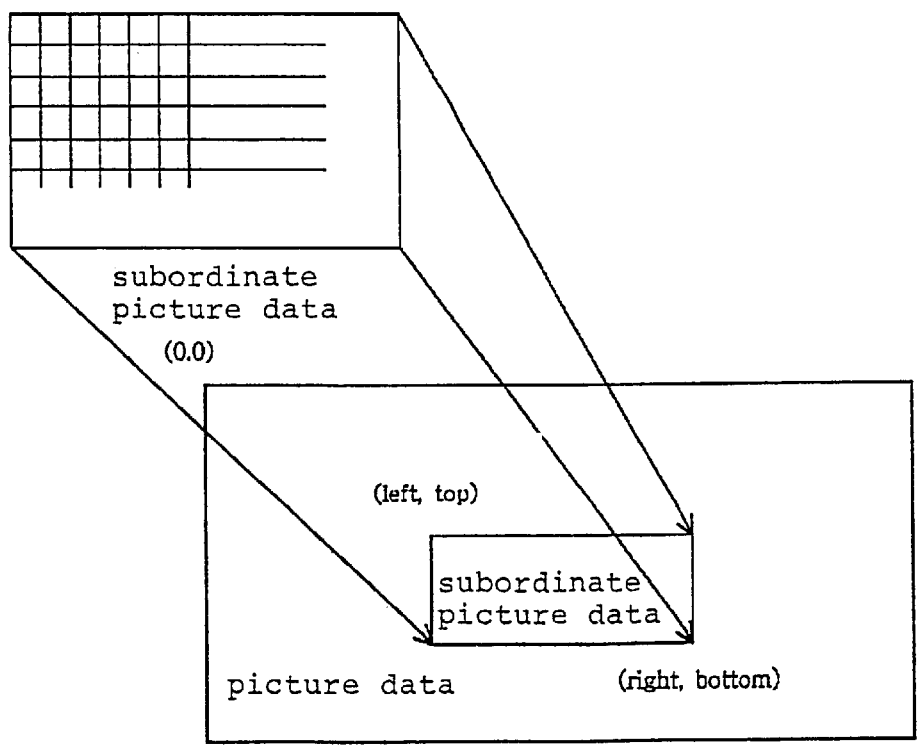
FIG. 2 is an illustration of a process in which a picture-synthetic section synthesizes subordinate-picture data on a main picture at the designated synthesizing positions (left, top), (right, bottom).

Picture-synthetic section 15 synthesizes the subordinate picture data converted by subordinate-picture-data-converting section 14 on the main picture at the designated-synthetic positions (left, top), (right, bottom) as shown in FIG. 2.

Figures 3, 4:
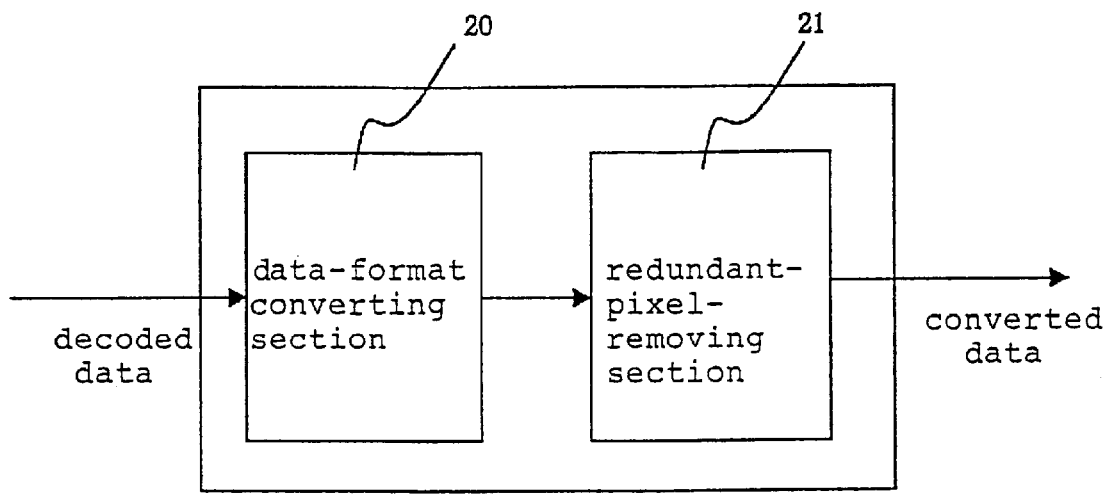
FIG. 3 is a block diagram of a subordinate-picture-data-converting section.
FIG. 4 is an illustration of a format of subordinate picture data after a run-length decoding.

FIG. 3 is a block diagram of subordinate-picture-data-converting section 14 including a data-format-converting section 20 for reducing the number of table-looking-up operations required for a picture synthesizing process and a redundant-pixel-removing section 21 for removing redundant pixel data whose contrast is zero and hence which can not be seen even if they are synthesized.

Next, the action of the preferred embodiment of the present invention will be described in detail with reference to FIG. 1 to FIG. 9.

Data-separating section 11 separates the subordinate picture data compressed and encoded by the run-length system from the multiplex data read out of memory device 10 in FIG. 1. A run-length-decoding process is performed by subordinate-picture-decoding section 13 for the separated subordinate-picture data. A data conversion process is performed by subordinate-picture-data-converting section 14 for the decoded subordinate picture data.

First, the action of data-format-converting section in FIG. 3 will be described.

The subordinate picture data decoded by the run-length system has the pixel data of n values and is separately given contrast information and color information for showing a synthetic ratio of each pixel when the subordinate picture is synthesized on the main picture.

FIG. 4 shows a format of the subordinate picture data after the run-length decoding. Each pixel after decoding, as shown in FIG. 4, takes any one of the values from 0 to n-1.

Figures 5, 6, 7:
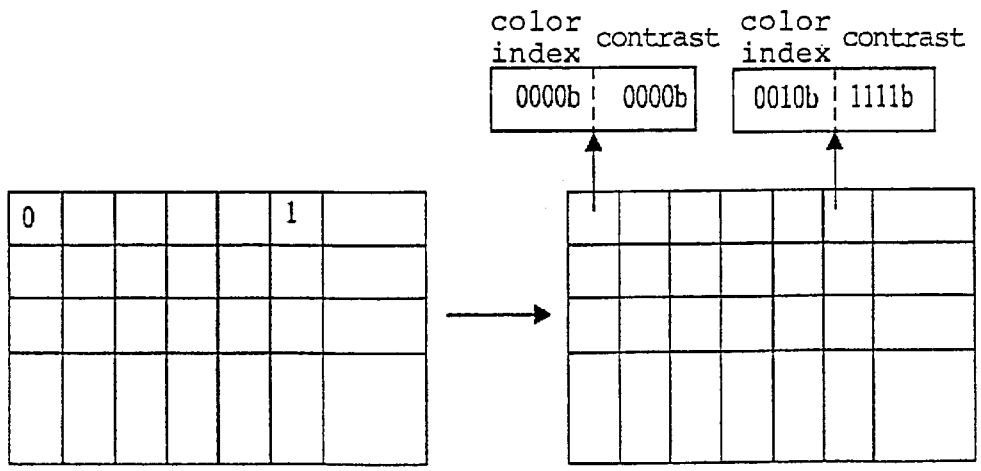
FIG. 5 is an illustration of a reference table of the contrast information and the color information of each pixel.
FIG. 6 is an illustration of one example of a format conversion method of pixel data.
FIG. 7 is an illustration of another example of a format conversion method of pixel data.

FIG. 5 shows a reference table of the contrast information and the color information of each pixel. The reference table is constituted by an index table which designates for each pixel data of n values a color index for showing the number of colors used of a maximum of m colors and a contrast for showing a synthetic ratio, and a color table which designates color information (Y-brightness, U-color difference of red, V-color difference of blue) for each color index.

In this way, in the case where the contrast information and the color information for each pixel after the run-length decoding are designated by the two tables, if a synthesizing process is performed by picture-synthetic section 15 in FIG. 1 with the use of the data format as it is, two table-look-up operations are required to superimpose one pixel. For example, in the case where one certain subordinate picture data is synthesized on the main picture of thirty frames, sixty table-looking-up operations, 30×2 =60, are required for one pixel.

Further, in the case where the pixel data after the run-length decoding is converted into the YUV data by performing the table-looking-up operation for the data of each pixel and then the synthesizing process is performed, the amount of data transfer between subordinate-picture-decoding section 13 and picture-synthetic section 15 is increased because the data per pixel amounts to YUV 24 bits.

Therefore, after the pixel data is decoded by the run-length system, the format of the pixel data is converted by merely looking up the index table for the data of each pixel and then the pixel data is output to picture-synthetic section 15 in FIG. 1.

In FIG. 6 and FIG. 7, one example of the method is shown by which the format of the pixel data is converted.

In this example, the subordinate picture data after the run-length decoding is binary pixel data and the color data is a maximum of 16 colors and the contrast data takes on values from 0 to 15.

First, in the case where the binary value of the pixel data after the run-length decoding is "0", the color index value is "0" and the contrast value is "0". Therefore, "0000b" for indicating the color index is inserted into the higher-order 4 bits of the pixel data after conversion and "0000b" for indicating the contrast value is inserted into the lower-order 4 bits thereof. Similarly, in the case where the binary value of the pixel data is "1", the color index value is "2" and the contrast value is "15". Therefore, "0010b" for indicating the color index is inserted into the higher-order 4 bits of the pixel data after conversion and "1111b" for indicating the contrast value is inserted into the lower-order 4 bits thereof.

In this way, the pixel data after the run-length decoding is converted into 8-bit data per pixel for indicating the color index value and the contrast value and then is output to the picture-synthetic section.

Picture-synthetic section 15 in FIG. 1 merely looks up the color table using the data converted by subordinate-picture-data converting section 14 and synthesizes it on the main picture in the form of YUV.

According to the present invention, only one table-looking-up operation is required by picture-synthetic section 15 for synthesizing one pixel. For example, in the case where one certain subordinate-picture data is superimposed on the main pictures of 30 frames, the number of table-looking-up operations is thirty, 30 ×=30. In this respect, the amount of data transfer per pixel between subordinate-picture-decoding section 13 and picture-synthetic section 15 is 8 bits.

In this connection, in the case where the contrast value takes 16 synthetic ratios from 0 to 15 as is the case in the present preferred embodiment, the picture-synthetic section synthesizes the subordinate picture on the main picture according to the synthetic ratio shown by the following equation:

main picture: subordinate picture =16−k/16: k/16 where,
if the contrast value is 0, k=contrast value, and
if the contrast value is not 0, k=contrast value +1

In the present preferred embodiment, the case has been described where both the color index value and the contrast value take values from 0 to 15. However, it is also possible by changing the number of bits to respond to the other cases; for example, 5 bits for the case where the color index value and the contrast value take values from 0 to 3, and 6 bits for the case where they take values from 0 to 63.

Next, the action of the redundant- pixel- removing section in FIG. 3 will be described.

Figure 8:
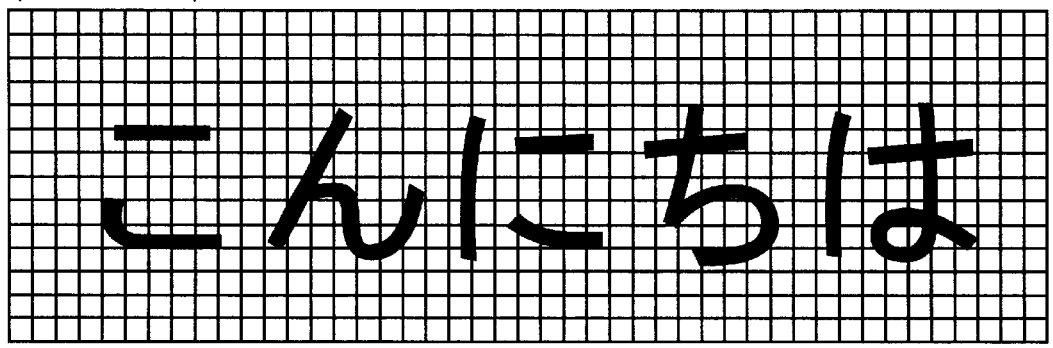
FIG. 8 illustrates that the subordinate-picture-data after a run-length decoding includes the redundant pixel data whose contrast values are "0" around effective pixels (character data).

As shown in FIG. 8, the subordinate picture data after the run-length decoding includes many redundant pixel data whose contrast values are "0" around the effective pixels (character data). Even if such pixel data is synthesized on the main picture by picture-synthetic section 15 in FIG. 1, the main picture is omitted 100 percent, which never produces a visual effect.

Figure 9:
FIG. 9 illustrates that only a rectangular region including effective pixels is output to a picture-synthetic section by changing the display positions of subordinate-picture-data to the main picture.

Therefore, as shown in FIG. 9, in the case where y1 lines whose contrast values are all "0" exist in the upper side outside a rectangular region including effective pixels, y2 line exist in the lower side, x1 lines exist in the left side, and x2 lines exist in the right side, the display positions to the main picture are changed according to the following equations:

left'=left+x1
top'=top+y1
right'=right−x2
bottom'=bottom−y2

And only the rectangular region which includes the effective pixels is output to picture-synthetic section 15 in FIG. 1.

Picture-synthetic section 15 in FIG. 1 synthesizes the subordinate picture data on the main picture in the form of YUV only for the rectangular region which includes the effective pixels received from subordinate-picture-data-converting section 14.

In particular, in the case where there is no effective pixel in the subordinate picture data, the data is not transferred to picture-synthetic section 15. In other words, picture-synthetic section 15 does not synthesize the subordinate picture data on the main picture.

As described above, the effect of the present invention lies in that the present invention can reduce a load of the synthesizing process when a still picture such as movie or karaoke subtitles is synthesized on the moving picture and reduce a load on a CPU in the synthesizing process and increase the number of output frames of the main picture.

Firstly, this is because the number of table-looking-up operations in the synthesizing process can be reduced by converting the pixel data of n values after the run-length decoding into the pixel data including the color information and the contrast information and by transferring the pixel data to the picture-synthetic section.

Secondly, this is because the redundant pixel data, which exists around the character data and whose contrast value is "0" and hence which does not produce the visual effect even if synthesized, is not transferred to the picture-synthetic section and hence the synthesizing process is not performed to thereby reduce the number of computations when the synthesizing process is performed.

What is claimed is:

1. A picture-synthetic system comprising a memory device, a data-separating section, a picture-decoding section, a subordinate-picture-decoding section, a subordinate-picture-data-converting section, and a picture-synthetic section, wherein the memory device has means for memorizing multiplex data of picture data compressed and encoded by a MPEG system and subordinate picture data compressed and encoded by a run-length system;

the data-separating section has means for separating the picture data compressed and encoded by the MPEG system and the subordinate picture data compressed and encoded by the run-length system from the multiplex data read out of the memory device and for outputting the picture data compressed and encoded by the MPEG system to the picture-decoding section and the subordinate picture data compressed and encoded by the run-length system to the subordinate-picture-decoding section;

the picture-decoding section has means for decoding the picture data compressed and encoded by the MPEG system and for outputting MPEG-decoded data to the picture-synthetic section;

the subordinate-picture-decoding section has means for decoding the subordinate picture data compressed and encoded by the run-length system and for outputting run-length-decoded data to the subordinate-picture-data-converting section;

the subordinate-picture-data-converting section has a data-format-converting section for converting a format of the run-length-decoded data, a redundant-pixel-removing section for removing redundant pixels of the run-length-decoded data, and means for outputting converted data to the picture-synthetic section; and the picture-synthetic section has means for synthesizing the converted data received from the subordinate-picture-data-converting section on the MPEG-decoded data received from the picture-decoding section in a form of YUV to display.

2. A picture-synthetic system as claimed in claim 1, wherein the data-format-converting section has means for converting the run-length-decoded data into 8-bit data which indicates a color index value and a contrast value per pixel.

3. A picture-synthetic system as claimed in claim 1, wherein the redundant-pixel-removing section has means for changing a display position to a main picture and for outputting to the picture-synthetic section only a rectangular region which includes effective pixels of the run-length-decoded data, in a case where a region of redundant pixels whose contrast values are all "0" exists outside the rectangular region which includes the effective pixels of the run-length-decoded data.

4. A picture-synthetic method for the picture-synthetic system as claimed in claim 1, comprising the steps of:

memorizing multiplex data of the picture data compressed and encoded by the MPEG system and the subordinate picture data compressed and encoded by the run-length system in the memory device;

separating the picture data compressed and encoded by the MPEG system and the subordinate picture data compressed and encoded by the run-length system from the multiplex data read out of the memory device and outputting the picture data compressed and encoded by the MPEG system to the picture-decoding section and the subordinate picture data compressed and encoded by the run-length system to the subordinate-picture-decoding section, in the data-separating section;

decoding the picture data compressed and encoded by the MPEG system and outputting the MPEG-decoded data to the picture-synthetic section in the picture-decoding section;

decoding the subordinate picture data compressed and encoded by the run-length system and outputting the run-length-decoded data to the subordinate-picture-data-converting section in the subordinate-picture-decoding section;

converting a format of the run-length-decoded data by the data-format-converting section and removing the redundant pixels of the run-length-decoded data by the redundant-pixel-removing section, and outputting the converted data to the picture-synthetic section in the subordinate-picture-data-converting section;

synthesizing the converted data received from the subordinate-picture-data-converting section on the MPEG-decoded data received from the picture-decoding section in a form of YUV to display in the picture-synthetic section.

5. A picture-synthetic method as claimed in claim 4, further comprising the step of converting the run-length-decoded data into an 8-bit data which indicates a color index value and a contrast value per pixel in the data-format-converting section.

6. A picture-synthetic method as claimed in claim 4, further comprising the step of changing a display position to a main picture and outputting only a rectangular region which includes effective pixels of the run-length-decoded data to the picture-synthetic section in the redundant-pixel-removing section, in a case where a region of redundant pixels whose contrast values are all "0" exists outside the rectangular region which includes the effective pixels of the run-length-decoded data.

* * * * *